United States Patent
Simon (10) Patent No.: US 8,074,336 B2
(45) Date of Patent: Dec. 13, 2011

(54) METHOD OF FORMING A TORSIONAL VIBRATION DAMPING DISK

(75) Inventor: Timothy Simon, Wooster, OH (US)

(73) Assignee: Schaeffler Technologies GmbH & Co., KG, Herzogenaurach (DE)

( * ) Notice: Subject to any disclaimer, the term of this patent is extended or adjusted under 35 U.S.C. 154(b) by 426 days.

(21) Appl. No.: 12/290,074

(22) Filed: Oct. 27, 2008

(65) Prior Publication Data

US 2009/0107793 A1    Apr. 30, 2009

Related U.S. Application Data

(60) Provisional application No. 61/001,135, filed on Oct. 31, 2007.

(51) Int. Cl.
 *B21D 39/00* (2006.01)
 *F16F 15/121* (2006.01)

(52) U.S. Cl. ............. 29/509; 29/513; 29/515; 74/574.4; 464/67.1

(58) Field of Classification Search ............... 29/402.08, 29/509, 510, 511, 512, 513, 515, 896.9, 896.91, 29/896.93, 505; 72/379.2; 464/67.1, 66.1–9; 74/574.4

See application file for complete search history.

(56) References Cited

U.S. PATENT DOCUMENTS

| | | | | |
|---|---|---|---|---|
| 3,657,781 A  * | 4/1972 | Camosso | ................ | 29/898.066 |
| 4,908,924 A  * | 3/1990 | Tsuruta et al. | ................... | 29/888 |
| 6,675,457 B1 | 1/2004 | Redmond et al. | | |
| 2006/0288815 A1* | 12/2006 | Uhler et al. | .................. | 74/574.4 |

* cited by examiner

*Primary Examiner* — Jermie Cozart
(74) *Attorney, Agent, or Firm* — Simpson & Simpson, PLLC (57) ABSTRACT

A method of forming a torsional vibration damping disk, including the steps of: stamping a concave surface at a periphery of a disk; heat treating the stamped disk; placing at least one forming element at least partially in contact with at least a portion of the concave surface; and curling the periphery to partially surround the at least one forming element so that the at least one forming element is removable from the disk. In a second embodiment, the method includes the step of removing the at least one forming element after curling the periphery and includes the step of replacing the at least one forming element with at least one spring element.

12 Claims, 6 Drawing Sheets

METHOD OF FORMING A TORSIONAL VIBRATION DAMPING DISK

CROSS-REFERENCE TO RELATED APPLICATIONS

This patent application claims the benefit under 35 U.S.C. §119(e) of U.S. Provisional Patent Application No. 61/001,135, filed Oct. 31, 2007, which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a method of producing a torque converter torsional vibration damping disk.

BACKGROUND OF THE INVENTION

It is known to provide torsional vibration damping disks (or spring retainer plates) with spring elements located within the periphery of the retainer. Prior art spring retainer plates used one or more support segments radially inward of the spring elements to retain the spring elements within the retainer plate and prevent the spring elements from falling out.

U.S. Pat. No. 6,675,457 discloses a one-piece torsional vibration damper retainer plate in which the annular periphery of the retainer plate is curled. The retainer plate is then heat treated and spring elements are located within the heat treated annular periphery. The final step is to completely curl the annular periphery about the spring elements to form a generally C-shaped channel to substantially surround the spring elements to prevent the spring elements from being removed from the C-shaped channel of the retainer plate. Unfortunately, the spring elements cannot be removed after the final curling. Therefore, if there is a defect in any of the springs, the entire retainer plate must be scrapped, since the spring elements are not replaceable. Further, undesirable deformation in the curled portion can occur since a relatively large portion of the curled portion is manipulated in each step to reduce production costs and the curled portion of the retainer is not fully supported during the curling process.

Thus, there is a long-felt need for a method to form a torsional vibration damping disk from one piece which is capable of holding spring elements without additional components while still allowing removal of the spring elements and reducing deformation of the disk during production.

BRIEF SUMMARY OF THE INVENTION

The present invention broadly comprises a method of forming a torsional vibration damping disk, including the steps of: stamping a concave surface at a periphery of a disk; heat treating the stamped disk; placing at least one forming element at least partially in contact with at least a portion of the concave surface; and curling the periphery to partially surround the at least one forming element so that the at least one forming element is removable from the disk. In a second embodiment, the method includes the step of removing the at least one forming element after curling the periphery and includes the step of replacing the at least one forming element with at least one spring element.

In a preferred embodiment, the method includes the step of stamping a plurality of spring seats into the disk, the at least one forming element includes a plurality of springs, and placing at least one forming element at least partially in contact with at least a portion of the concave surface includes placing the plurality of springs in contact with the plurality of spring element seats. In the preferred embodiment, the at least one forming element includes a plurality of springs and each spring in the plurality of springs is held within the concave surface by a pretension of each spring. In the preferred embodiment, curling the periphery to at least partially surround the at least one forming element includes urging the concave surface against the at least one forming element.

The present invention broadly comprises a method of forming a torsional vibration damping disk, including the steps of: stamping a concave surface at a periphery of a disk; heat treating the stamped disk; placing at least one first spring element at least partially in contact with at least a portion of the concave surface; and curling the periphery to partially surround the at least one first spring element so that the at least one forming element is removable from the disk. In a second embodiment, the method includes the step of removing the at least one first spring element after curling the periphery and replacing the at least one first spring element with at least one second spring element.

In a third embodiment, the at least one second spring is a plurality of spring elements and each spring in the plurality of springs is held within the concave surface by a pretension of each spring. In a preferred embodiment, the method includes the step of stamping a plurality of spring element seats into the disk, the at least one first spring element includes a plurality of springs, and placing at least one first spring element at least partially in contact with at least a portion of the concave surface includes placing the plurality of springs in contact with the plurality of spring element seats. In the preferred embodiment, the at least one first spring element includes a plurality of springs and each spring in the plurality of springs is held within the concave surface by a pretension of each spring. In the preferred embodiment, curling the periphery to at least partially surround the at least one first spring element includes urging the concave surface against the at least one first spring element.

It is a general object of the present invention to provide a method of forming a torsional vibration damping disk which releasably holds spring elements.

It is a general object of the present invention to provide a method of forming a one-piece torsional vibration damping disk which prevents deformation while forming a lip in the disk.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
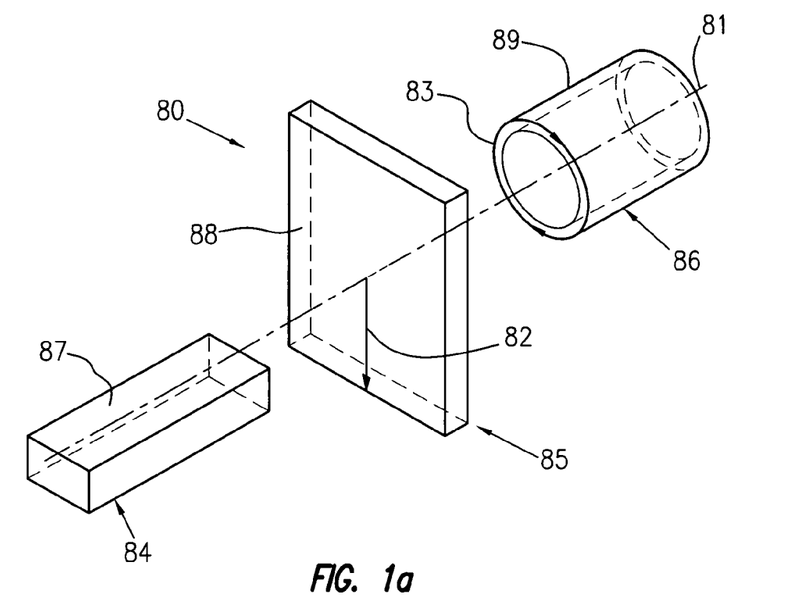
FIG. 1a is a perspective view of a cylindrical coordinate system demonstrating spatial terminology used in the present application.

FIG. 1a is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
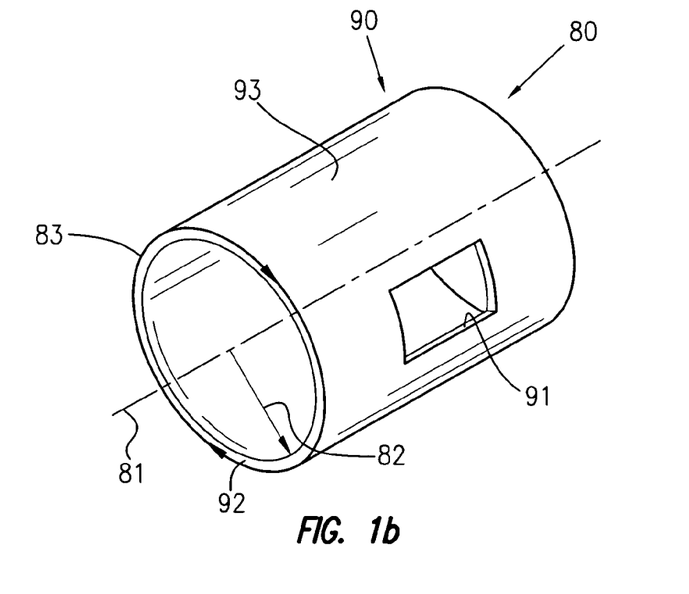
FIG. 1b is a perspective view of an object in the cylindrical coordinate system of FIG. 1a demonstrating spatial terminology used in the present application.

FIG. 1b is a perspective view of object 90 in cylindrical coordinate system 80 of FIG. 1a demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
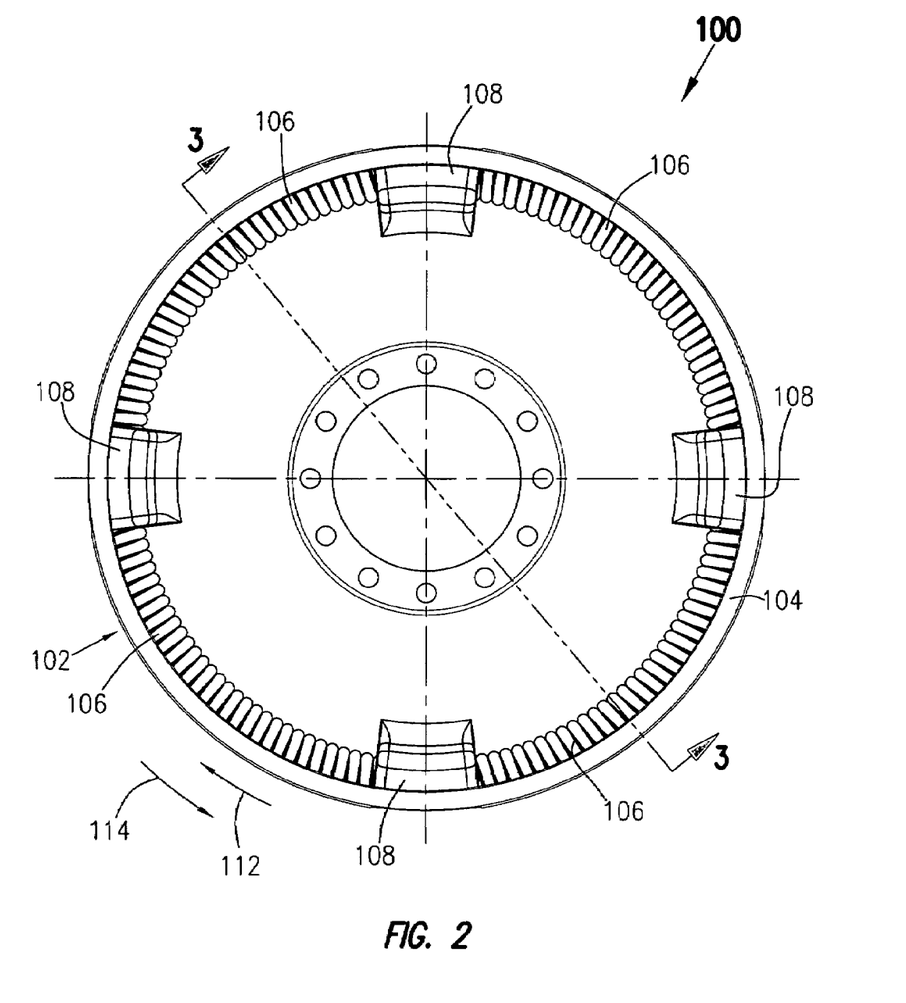
FIG. 2 is a front view of an assembled torsional vibration damping disk formed by a present invention method for forming a torsional vibration damping disk.

FIG. 2 is a front view of assembled torsional vibration damping disk 100 formed by a present invention method for forming a torsional vibration damping disk.

Figure 3:
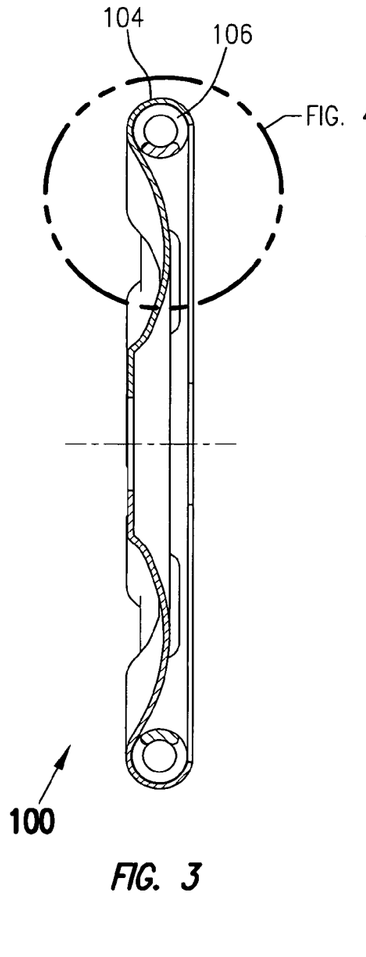
FIG. 3 is a cross-sectional view of the assembled torsional vibration damping disk shown in FIG. 2 taken generally about line 3-3 in FIG. 2.

FIG. 3 is a cross-sectional view of assembled torsional vibration damping disk 100 shown in FIG. 2 taken generally about line 3-3 in FIG. 2.

Figure 4:
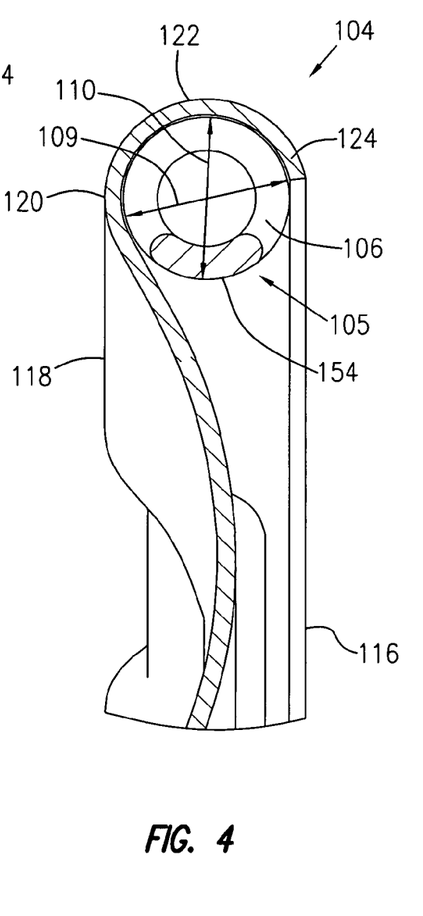
FIG. 4 is an enlarged view of encircled area 4 in FIG. 3.

FIG. 4 is an enlarged view of encircled area 4 in FIG. 3. The following should be viewed in light of FIGS. 2 through 4. Assembled torsional vibration damping disk 100 is located within a torque converter (not shown) and is connected, by any means known in the art, to a turbine shell or hub to absorb vibrations which would otherwise be resonated through the drive train and ultimately to the operator. In one embodiment, disk 100 is riveted to the turbine shell or hub. The damping disk includes a generally circular body 102 which extends radially outward terminating in lip 104. Lip 104 is integral to and formed from body 102 so as to provide concave holding area 105 for spring 106. Lip 104 extends back towards body 102 about the entire circumference of body 102. Each spring 106 is located between stops 108. Stops 108 extend radially inward from lip 104 and are formed as part of body 102 in the stamping process described infra. Although the figures show four stops and four springs, it should be readily apparent to one of ordinary skill in the art that any combination of springs and stops are within the spirit and scope of the invention as claimed.

As seen in FIGS. 3 and 4, springs 106 can be removed or installed within lip 104 even after lip 104 has been completely formed. For example, opening 109 for area 105 is larger than diameter 110 of springs 106. Lip 104 is curled to a point such that springs 106 can be located within the concave cavity of lip 104, yet lip 104 still allows springs 106 to move clockwise or counter-clockwise, in directions 112 or 114, respectively, within area 105 to absorb unwanted vibrations. For example, as noted infra, the springs are preloaded to impart a force holding the springs within area 105. By curled, we mean deforming the lip in a generally circular way through stamping or a similar material deformation procedure. Lip 104 is curled back towards body 102 to provide support for springs 106. In one embodiment, lip 104 is curled such that springs 106 are located on top side 116 of body 102 as shown. In one embodiment (not shown), lip 104 is curled towards bottom side 118 of body 102. This embodiment may be desirable in torque converter designs in which it is desirable to limit the use of axial space on the front side of the torsional vibration damper disk. Advantageously, both arrangements of lip 104 hold springs 106 while allowing the springs to be removed if they are found to be defective, to have an incorrect spring constant, if the springs are damaged during further production or testing, or if the body is damaged during further production or testing. Similarly, the ability to remove springs 106 reduces scrap by allowing salvage of the springs or the body if only one of the other components is damaged.

Adverting to FIG. 4, lip 104 is shown in greater detail after the final curling procedure with lower spring support 120, side spring support 122, and upper spring support 124. Generally, the entire lower (using upper and lower sides 116 and 118, respectively, as references) portions of springs 106 are supported by lower spring support 120. Side spring support 122 also supports the entire radially outside of springs 106. In operation, centrifugal forces present a force urging the springs away from opening 109 and into support 122. However, upper spring support 124 does not fully support springs 106. Since the upper spring support 124 does not fully enclose springs 106, springs 106 can be removed if necessary. Due to the fact that the torsional vibration damping disk is rotated while in operation, the centrifugal forces imparted on the spring in combination with side spring support 122 prevent springs 106 from leaving area 105 while in operation.

Springs 106 are preferably coil springs which are arranged in a circular pattern to fit within area 105. Springs 106 may also be arc springs, meaning the springs are formed so that the body of the spring has a curved shape to fit within opening 109 when body 102 is generally circular. Springs 106 are held in place by pre-stressing, or a small amount of compression. By pre-stressing, we mean that springs 106 are slightly compressed before installation and remain in the slightly compressed state between stops 108. In this arrangement, springs 106 are slightly longer than the distance between the stops, thereby permitting springs 106 to be held in compression after they are installed. That is, the springs are urged radially outward against support 122.

Figure 5:
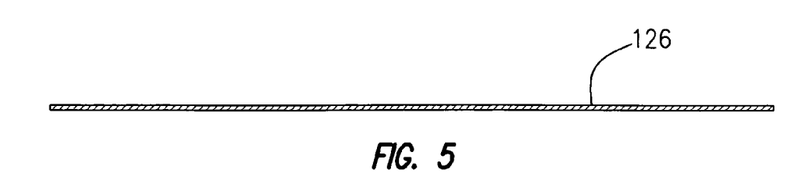
FIG. 5 is a cross-sectional view of a blank before an initial stamping operation in a present invention method for forming a torsional vibration damping disk.
Figure 6:
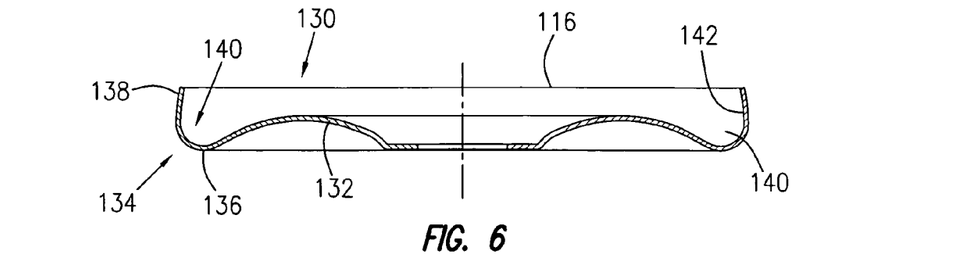
FIG. 6 is a cross-sectional view of a partially formed torsional vibration damping disk illustrating an initial stamping operation in a present invention method for forming a torsional vibration damping disk.
Figure 7:
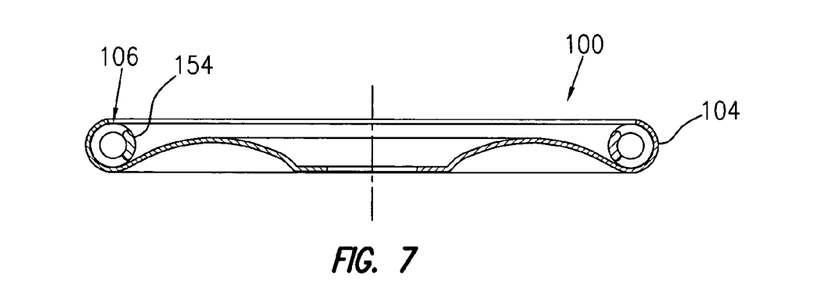
FIG. 7 is a cross-sectional view of a torsional vibration damping disk illustrating a final stamping operation in a present invention method for forming a torsional vibration damping disk.

FIGS. 5 through 7 are cross-sectional views illustrating a present invention method for forming a torsional vibration damping disk. As further described infra, a blank is initially stamped to partially form a body for a present invention torsional vibration damping disk, the stamped blank is heat treated, springs or fixtures are positioned in a concave area formed by the initial stamping, and a final stamping step forms the final shape of the body.

FIG. 5 is a cross-sectional view of blank 126 before an initial stamping operation in a present invention method for forming torsional vibration damping disk 100. Blank 126 is operated upon as described infra to form body 102. Blank 126 is preferably sheet metal and can vary in thickness depending upon the desired application. Blank 126 is also generally circular in shape, however if an application requires a different shape, the blank will ultimately resemble the final shape.

FIG. 6 is a cross-sectional view of a partially formed torsional vibration damping disk illustrating an initial stamping operation in a present invention method for forming torsional vibration damping disk 100. FIG. 6 shows disk 130 formed from blank 126 in an initial stamping operation. The initial stamping operation on blank 126 is a rough stamping operation that forms body portion 132 and partial lip 134. Partial lip 134 includes partial lower support 136, which is generally concave with respect to upper side 116, and lip wall periphery 138 which is bent slightly inward towards body portion 132. Similar to FIGS. 2 through 4, body 132 and partial lip 134 are generally circular and arranged to both receive and secure springs. The initial stamping also forms cavity 140, an internal space surrounded by body portion 132, partial lower support 136, and lip wall periphery 138. Cavity 140 is a partial forming of area 105 described supra. Therefore, area 105 is only partially formed and lip wall periphery 138 maintains a continuously smooth and generally round inner surface without pinching or undesired material deformation. By pinching, we mean material deformation which creates a cavity that is not smooth or c-shaped. If the lip wall periphery 138 is pinched, there may be gaps between a spring or other cylindrical object and inside surface 142 of lip wall periphery 138. Undesirably, the gaps allow the spring to move in a direction other than circumferentially, creating vibrations and noise. Thus, the stamping process forms only a portion of the final cavity, to greatly reduce the possibility of pinching or undesired material deformation.

After the stamping operation described for FIG. 6, disk 130 is heat treated. Heat treating hardens the material of disk 130 to prevent unwanted deformation and increase the useful life of the part.

FIG. 7 is a cross-sectional view of a torsional vibration damping disk illustrating a final stamping operation in a present invention method for forming torsional vibration damping disk 100. The following should be viewed in light of FIGS. 6 and 7. FIG. 7 is a cross-sectional view of a torsional vibration damping disk 100 with lip 104 partially curled around springs 106 by a final stamping operation. After heat treating, a further stamping operation is performed on disk 130. In the preferred embodiment, prior to performing the further stamping operation, at least one spring 106 is located within concave cavity 140 after the stamping and heat treating operations described supra. Springs 106 are supported on the bottom by partial lower support 136 and on the radially outward portion by lip wall periphery 138. Likewise, springs 106 provide support for the portions of support 136 and periphery 138 with which the spring is in contact. After the springs are located in the cavity, a final stamping operation curls periphery 138 around circumference 154 of springs 106. Since springs 106 have a round cross-section and are located in cavity 140 during the curling process, springs 106 are urged into support 136 and periphery 138 is curled around the circumference of the springs to form lip 104 shown in FIG. 2. To enable removal of springs 106, periphery 138 is curled around no more than one-half of circumference 154 of the springs. Thus, the springs provide support for partial lip 134 during the final stamping process, which prevents undesirably crimping or deformation of lip 134 as the final stamping process forms lip 134 into lip 104. That is, lip 134 is able to "roll around" the springs.

Figure 8:
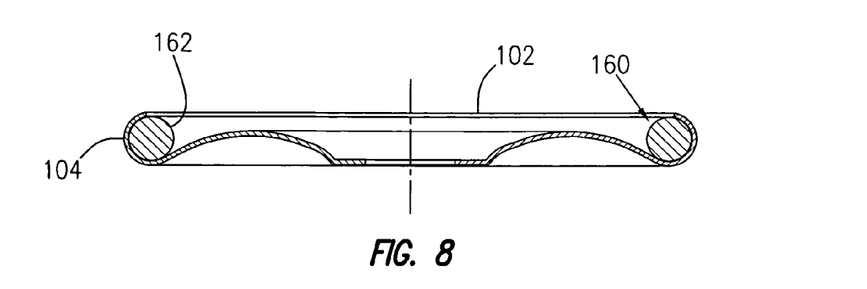
FIG. 8 is a cross-sectional view of a torsional vibration damping disk illustrating a final stamping operation in a present invention method for forming a torsional vibration damping disk.

FIG. 8 is a cross-sectional view of a torsional vibration damping disk illustrating a final stamping operation in a present invention method for forming torsional vibration damping disk 100. The following should be viewed in light of FIGS. 6 and 8. After heat treating, a further stamping operation is performed on disk 130. In another embodiment, prior to performing the further stamping operation, at least one fixture 160 is located within concave cavity 140 after the stamping and heat treating operations described supra. Any fixture known in the art can be used for fixtures 160. Fixtures 160 provide support for the portions of support 136 and periphery 138 with which the spring is in contact. After the springs are located in the cavity, a final stamping operation curls periphery 138 around circumference 162 of fixtures 160. Since fixtures 160 have a round cross-section and are located in cavity 140 during the curling process, fixtures 160 are urged into support 136 and periphery 138 is curled around the circumference of the fixtures to form lip 104 shown in FIG. 2. To enable removal of fixtures 160, periphery 138 is curled around no more than one-half of circumference 162 of fixtures 160. Thus, fixtures 160 provide support for partial lip 134 during the final stamping process, which prevents undesirable crimping or deformation of lip 134 as the final stamping process forms lip 134 into lip 104. That is, lip 134 is able to "roll around" fixtures 160. Since lip 104 is only partially curled, fixtures 160 can be removed after curling and be replaced with springs, for example, springs 106. The round fixtures ensure that the curling process produces a smooth internal cavity for releasably securing the springs.

Figure 9:
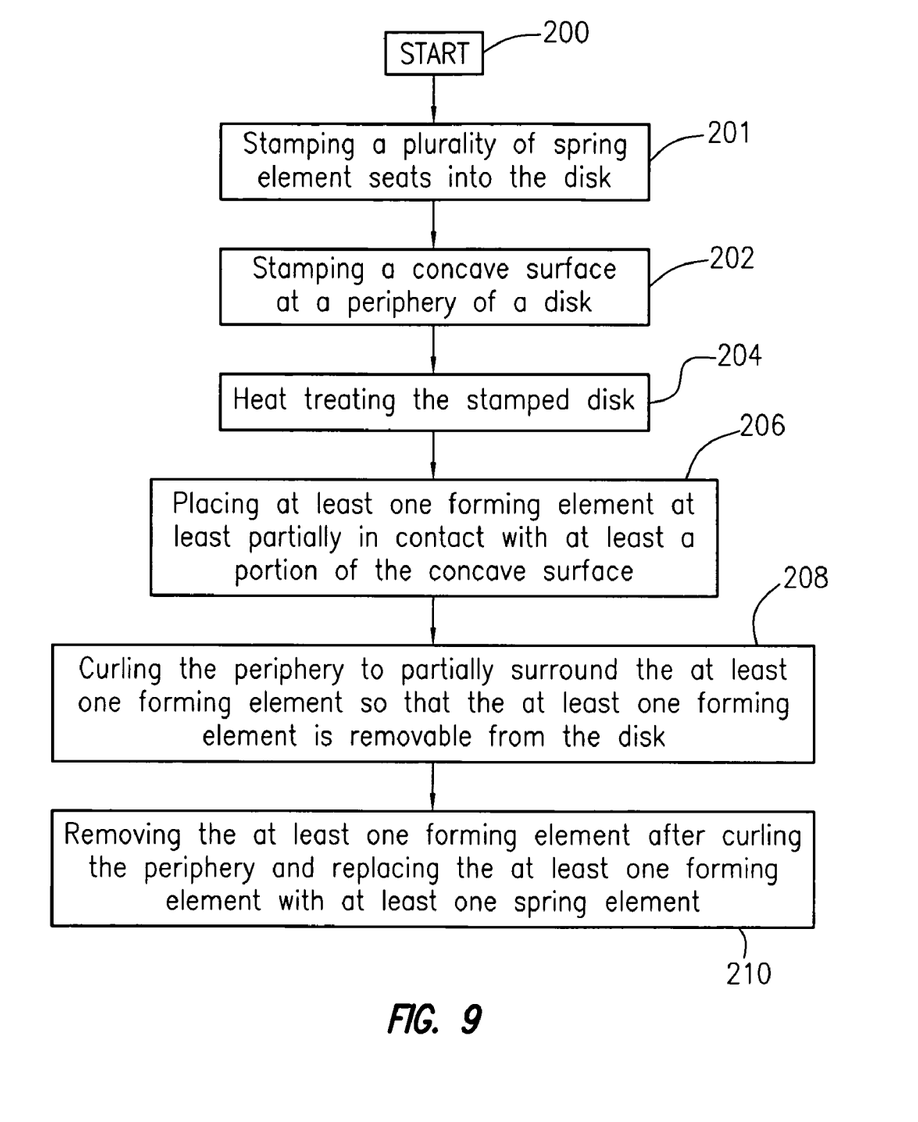
FIG. 9 is a flow chart illustrating a present invention method for forming a torsional vibration damping disk; and, FIG. 10 is a flow chart illustrating a present invention method for forming a torsional vibration damping disk.

FIG. 9 is a flow chart illustrating a present invention method for forming a torsional vibration damping disk.

Although the method in FIG. 9 (and FIG. 10 below) is depicted as a sequence of numbered steps for clarity, no order should be inferred from the numbering unless explicitly stated. The method starts at step 200. Step 202 stamps a concave surface at a periphery of a disk. Step 204 heat treats the stamped disk. Step 206 places at least one forming element at least partially in contact with at least a portion of the concave surface. Step 208 curls the periphery to partially surround the at least one forming element so that the at least one forming element is removable from the disk. In a second embodiment, step 210 removes the at least one forming element after curling the periphery and replaces the at least one forming element with at least one spring element.

In a preferred embodiment, step 201 stamps a plurality of spring element seats into the disk, the at least one forming element includes a plurality of springs and placing at least one forming element at least partially in contact with at least a portion of the concave surface includes placing the plurality of springs in contact with the plurality of spring element seats. In the preferred embodiment, the at least one forming element includes a plurality of springs and each spring in the plurality of springs is held within the concave surface by a pretension of each spring. In the preferred embodiment, curling the periphery to at least partially surround the at least one forming element includes urging the concave surface against the at least one forming element.

Figure 10:
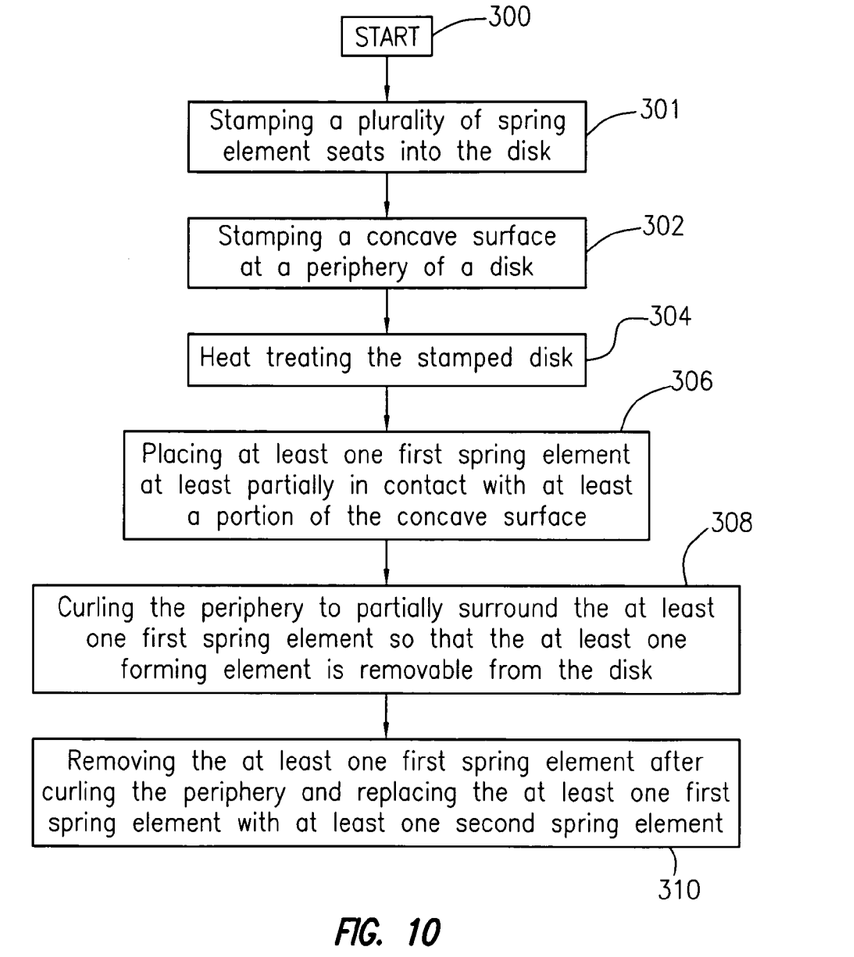

FIG. 10 is a flow chart illustrating a present invention method for forming a torsional vibration damping disk. The method starts at step 300. Step 302 stamps a concave surface at a periphery of a disk. Step 304 heat treats the stamped disk. Step 306 places at least one first spring element at least partially in contact with at least a portion of the concave surface. Step 308 curls the periphery to partially surround the at least one first spring element so that the at least one forming element is removable from the disk. In a second embodiment, step 310 removes the at least one first spring element after curling the periphery and replaces the at least one first spring element with at least one second spring element. In a third embodiment, the at least one second spring is a plurality of spring elements and each spring in the plurality of springs is held within the concave surface by a pretension of each spring.

In a preferred embodiment, step 301 stamps a plurality of spring element seats into the disk, the at least one first spring element includes a plurality of springs, and placing at least one first spring element at least partially in contact with at least a portion of the concave surface includes placing the plurality of springs in contact with the plurality of spring element seats. In the preferred embodiment, the at least one first spring element includes a plurality of springs and each spring in the plurality of springs is held within the concave surface by a pretension of each spring. In the preferred embodiment, curling the periphery to at least partially surround the at least one first spring element includes urging the concave surface against the at least one first spring element.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A method of forming a torsional vibration damping disk, comprising the steps of:
    stamping a concave surface at a periphery of a disk;
    heat treating the stamped disk;
    placing at least one forming element at least partially in contact with at least a portion of the concave surface;
    curling the periphery to partially surround the at least one forming element;
    removing the at least one forming element from the disk; and,
    inserting at least one spring in a space at least partially formed by the curled periphery.

2. The method of claim 1 further comprising the step of stamping a plurality of spring element seats into the disk and wherein the at least one forming element further comprises a plurality of springs and wherein placing at least one forming element at least partially in contact with at least a portion of the concave surface includes placing the plurality of springs in contact with the plurality of spring element seats.

3. The method of claim 1 wherein the at least one forming element further comprises a plurality of springs wherein each spring in the plurality of springs is held within the concave surface by a pretension of each spring.

4. The method of claim 1 wherein curling the periphery to at least partially surround the at least one forming element further comprises urging the concave surface against the at least one forming element.

5. A method of forming a torsional vibration damping disk, comprising the steps of:
    stamping a concave surface at a periphery of a disk;
    heat treating the stamped disk;
    placing at least one first spring element at least partially in contact with at least a portion of the concave surface; and,
    curling the periphery to partially surround the at least one first spring element so that the at least one first spring element is removable from a space at least partially formed by the curled periphery and the concave surface without uncurling the periphery.

6. The method of claim 5 further comprising the step of removing the at least one first spring element after curling the periphery.

7. The method of claim 6 further comprising the step of replacing the at least one first spring element with at least one second spring element.

8. The method of claim 7 wherein the at least one second spring is a plurality of spring elements.

9. The method of claim 8 wherein each spring in the plurality of springs is held within the concave surface by a pretension of each spring.

10. The method of claim 5 further comprising the step of stamping a plurality of spring element seats into the disk and wherein the at least one first spring element further comprises a plurality of springs and wherein placing at least one first spring element at least partially in contact with at least a portion of the concave surface includes placing the plurality of springs in contact with the plurality of spring element seats.

11. The method of claim 5 wherein the at least one first spring element further comprises a plurality of springs wherein each spring in the plurality of springs is held within the concave surface by a pretension of each spring.

12. The method of claim 5 wherein curling the periphery to at least partially surround the at least one first spring element further comprises urging the concave surface against the at least one first spring element.

* * * * *